United States Patent [19]
Runde et al.

[11] 3,781,576
[45] Dec. 25, 1973

[54] HIGH TEMPERATURE ULTRASONIC TRANSDUCER

[75] Inventors: Herbert Arthur Runde, Windsor Locks; Joseph Edward Kowles, Glastonbury, both of Conn.

[73] Assignee: Combustion Engineering, Inc., Windsor, Conn.

[22] Filed: Sept. 8, 1972

[21] Appl. No.: 287,396

[52] U.S. Cl. .................. 310/9.1, 73/67.8 R, 73/71.5
[51] Int. Cl. ........................................... H04r 17/00
[58] Field of Search ............................ 310/9.1–9.4; 73/71.5, 67.8 R, 67.8 S

[56] References Cited
UNITED STATES PATENTS

| | | | |
|---|---|---|---|
| 2,460,153 | 1/1949 | Smoluchowski | 310/9.1 |
| 2,592,134 | 8/1952 | Firestone | 73/67.8 |
| 2,645,938 | 7/1953 | Billstein | 73/67.8 S X |
| 2,661,714 | 12/1953 | Greenwood, Jr. et al. | 73/67.8 S X |
| 2,851,876 | 9/1958 | Arnold | 73/67.8 X |
| 2,908,161 | 10/1959 | Bincer | 310/9.1 X |
| 3,248,933 | 5/1966 | Stebbins | 73/67.8 S X |

*Primary Examiner*—J. D. Miller
*Assistant Examiner*—Mark O. Budd
*Attorney*—Eldon H. Luther et al.

[57] ABSTRACT

An ultrasonic transducer for use in a high temperature environment comprises a support frame supporting a crystal holder in turn supporting a piezoelectric crystal. Biasing means urge said crystal into non-rigid supported relationship with the crystal holder. The crystal surface facing the holder is electrically conductive and an electrically insulating material resistant to high temperatures is located between the crystal and the holder to maintain electrical isolation therebetween.

The crystal holder may be movable relative to the support frame to permit extending or withdrawing the crystal into or from an operative position and to allow the crystal orientation to be angularly varied relative to at least a part of the support frame.

12 Claims, 4 Drawing Figures

3,781,576

HIGH TEMPERATURE ULTRASONIC TRANSDUCER

BACKGROUND OF THE INVENTION

The invention relates generally to ultrasonic apparatus and more particularly to an ultrasonic transducer. More particularly still, the invention relates to an ultrasonic transducer suitable for operating in high temperature environments.

The technology of ultrasonics has been widely used for various testing purposes such as determining thickness, motion, location and integrity of various types of test pieces. These inspections or monitoring operations are generally performed under thermal conditions in which the test piece under inspection, and with which the ultrasonic transducer is in acoustical contact, is at a temperature close to that of the ambient. Under such circumstances, no special consideration for temperature is required in the construction of the ultrasonic transducer. However, in some instances, the ultrasonic transducer may be required to operate in an environment of greatly elevated temperatures. Examples of such conditions are the testing of hot metals during fabrication and the monitoring or inspection of completed products situated or operating in a high temperature environment. A good example of the latter situation is that in which ultrasonic equipment is utilized to monitor the vibrations of various components of a nuclear reactor at operating temperatures of several hundred degrees F or more.

The piezoelectric crystal, utilized for converting energy between a mechanical or acoustical state and the electrical state, and/or the transducer housing for the crystal, may be incapable of withstanding the elevated temperatures in the test region either due to their physical properties or type of construction. An example of this problem and one type of solution is represented in U. S. Pat. No. 2,697,936 issued Dec. 28, 1954 to C. Farrow entitled "Supersonic Testing of Hot Articles." In the patent cited, the piezoelectric crystal was incapable of withstanding the elevated temperatures of the hot test piece and a long signal conveying bar was coupled between the hot test piece and the crystal to remove the crystal from the region of elevated temperatures.

The apparatus described in the above-mentioned patent has two shortcomings however. The need for a signal conveying bar of extended length necessarily attenuates the transmitted and/or received ultrasonic signal. Such attenuation is almost always undesirable and in some instances may be intolerable. Further, space and geometry limitations in the immediate environment of the test piece may preclude use of a lengthy signal conveying bar.

In certain testing or monitoring environments the temperatures, while elevated, may not be so excessive as to prevent the use of certain modern heat resistant piezoelectric crystals. However, the materials of the transducer housing and various bonds therein and particularly bonds between the crystal and the housing have generally been unable to withstand these temperatures. This has been particularly so where the transducer housing is required to support the crystal in a manner providing for good acoustical coupling between the crystal and the test piece.

SUMMARY OF THE INVENTION

According to the invention there is provided an ultrasonic transducer assembly for use in elevated temperature environments. The materials of the transducer assmbly and the means used for interengaging one another are selected to withstand the temperatures experienced in the test environment and to reduce or accommodate differences in thermal expansion coefficients. The transducer employs a piezoelectric crystal capable of withstanding elevated temperatures. The crystal is electrically conductive at front and back surfaces thereof. A crystal holder includes a layer of electrically insulating material on a support surface thereof and the back conductive surface of the crystal is urged into supported, non-bonded contact with the insulating material. The crystal holder is supported by, and generally within, a support frame in movable relationship therewith. The crystal holder is movable between a forward operative position in which the crystal is presented for contact with a test piece or acoustical couplant communicating with the test piece and a withdrawn protective position within the support frame rearward of said operative position. The crystal holder is biased toward said operative position and means may be provided for releasibly locking the crystal and holder in the withdrawn protective position.

The support frame may include magnet means for engaging the transducer assembly with a ferromagnetic test piece. Further, the support frame may include a portion, such as the magnet means, which remain fixedly positioned relative to the test piece and another portion which may be moved relative thereto. The crystal holder is supported by and positioned relative to the support frame in a manner allowing some angular variation to the position of the crystal when one portion of the support frame is moved relative to the other.

The crystal is connected in an electrical circuit through two electrically conductive paths respectively to the front and back conductive surfaces of the crystal. One path is preferably through the transducer support frame to the crystal front surface and the other is electrically isolated from the support frame and crystal holder and contacts the conductive back surface of the crystal. This latter path may be provided through conductive spring means utilized to bias the crystal into supported contact with the insulating layer on the crystal holder.

DESCRIPTION OF THE PREFERRED EMBODIMENT

Figure 1:
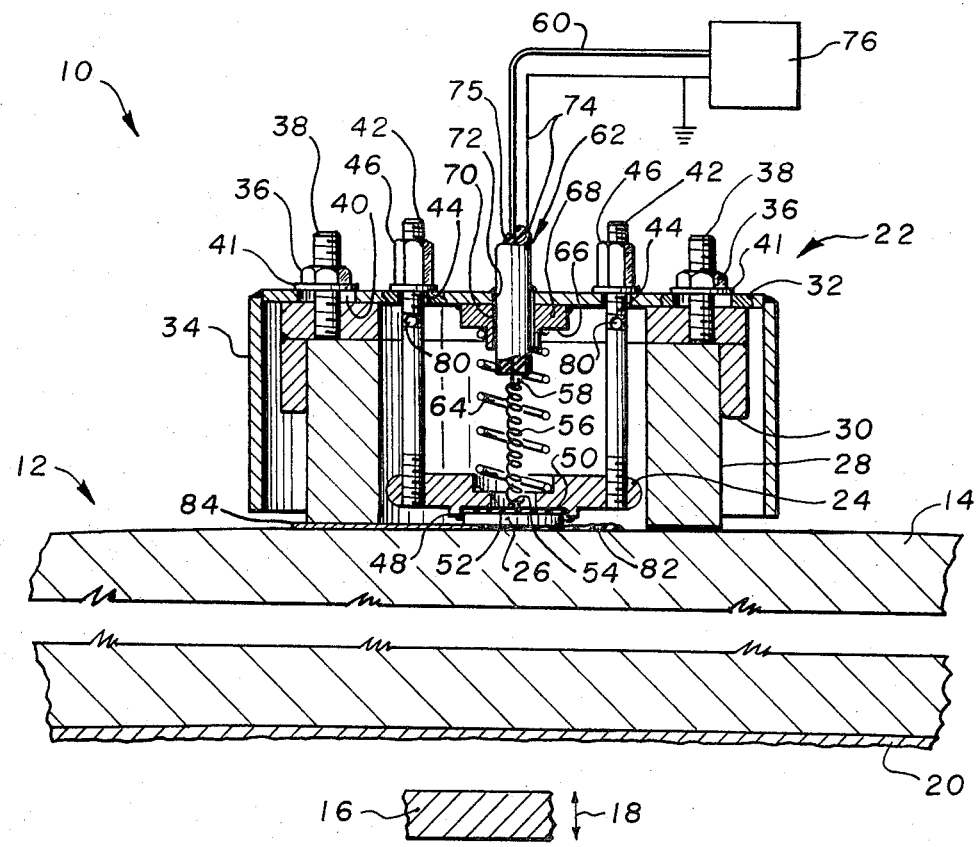
FIG. 1 is a sectional side view of the transducer of the invention with rods and studs rotated into the plane of view and having portions cut away.

Referring now to the drawing, FIG. 1 depicts an ultrasonic transducer 10 in accordance with the invention positioned in operative contact with a test piece 12 located within a high temperature environment. In the example depicted, test piece 12 comprises a portion of a nuclear reactor pressure vessel wall 14 and a portion of a nuclear core support barrel 16 positioned inwardly thereof in spaced relationship thereto. While such test piece members are shown, for sake of drawing convenience, as extending horizontally and being vertically displaced, it will be appreciated that they normally extend vertically and are laterally displaced. The temperature of test piece 12 and more particularly the outer surface of vessel wall 14 may range from 50° to 60° F to a normal operating temperature in the 550°–650° F range.

While ultrasonic transducer 10 might be used for monitoring or testing certain characteristics of vessel wall 14, in the example shown it is being utilized to monitor vibrations of core barrel 16 in the direction shown by arrow 18. Transducer 10 may be used in combination with another transducer, not shown, in only a transmitting or receiving mode or it may be used singularly to transmit and receive ultrasonic energy in a pulse-echo mode. Typically, vessel wall 14 is carbon steel 10 inches thick and includes a layer of stainless steel cladding 20 on the inner surface thereof. Barrel wall 16 may be spaced from clad surface 20 by a distance of 5–10 inches, this region being occupied by water or some other acoustically conductive medium. It will be realized that if the transducer 10 is operated in the pulse-echo mode, the ultrasonic energy will br required to transit a path having a length significantly greater than 1 foot. Because such path lengths greatly attenuate the ultrasonic signal strength, it is desirable that transducer 10 be positioned in as close proximity to test piece 12 as possible.

Ultrasonic transducer 10 essentially comprises a support frame 22 supporting a crystal holder 24 in turn supporting a piezoelectric crystal 26. Support frame 22 includes first and second portions variably positionable relative to one another. A first portion adapted to engage the surface of test piece 12 includes a cylindrical permanent magnet 28 received and retained at one end within a barrel or cup shaped magnet holder 30. Magnet 28 has tunnel-like cut-outs, not seen here, at its forward or base end to define the magnetic poles. Magnet holder 30 is adapted to engage the rear portion of magnet 28 in press-fit relationship therewithin and includes a stainless steel annular back end plate portion in axial contact with magnet 28 and a cylindrical stainless steel side portion welded thereto and in close radial engagement with the outer diameter of the magnet.

Figure 2:
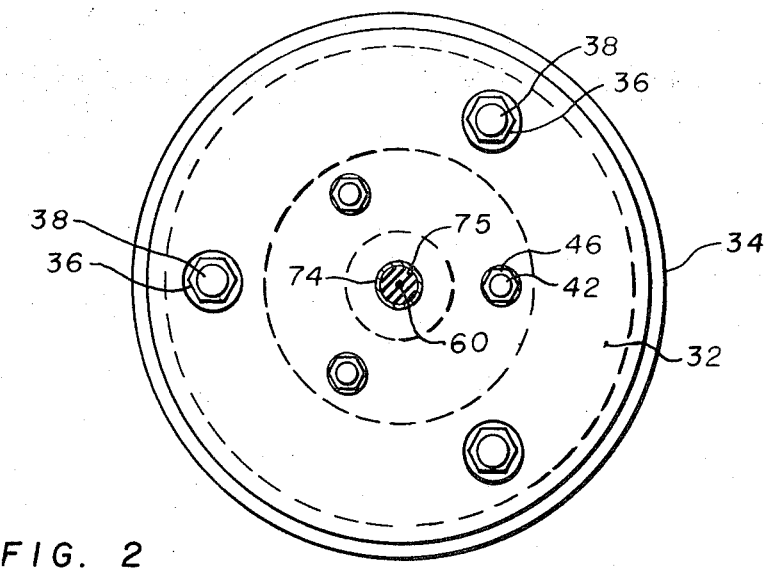
FIG. 2 is a top end view of the transducer of FIG. 1.

The second portion of support frame 22 includes backing plate 32 and protective housing 34. Backing plate 32 is a circular stainless steel disk having a diameter greater than that of the outer diameter of magnet housing 30 and resting in contact therewith thereabove or behind as depicted in FIG. 1. Protective housing 34 is a stainless steel cylinder having substantially the same diameter as backing plate 32 and joined at its upper end, as by welding, to the outer periphery of backing plate 32. The axial length of protective housing cylinder 34 is such that its forward or lower end terminates near, but preferably short of, the forward or lower end of magnet 28. Housing 34 protects the remainder of transducer 10 interior thereto against damaging contact with foreign articles. Backing plate 32 is held in close non-moving engagement with magnet housing 30 by means of a compressive force therebetween applied by nuts 36 acting downwardly on plate 32 through threaded engagement with studs 38 mounted in and extending upwardly from magnet housing 30. Studs 38 extend upwardly through circular openings 40 extending through backing plate 32. Each opening 40 is of a diameter significantly greater than that of the corresponding stud 38 extending therethrough for reasons to become evident hereinafter. Washers 41, having a diameter greater than that of opening 40, may be inserted between nuts 36 and plate 32 if the nut diameter is too small. Studs 38 and corresponding openings 40 may vary in number, however three, symmetrically displaced about the center of backing plate 32 and the axis of magnet 28, as seen in FIG. 2, are found to be satisfactory.

Crystal holder 24 is a circular, stainless steel disk having an outer diameter slightly less than the inner diameter of magnet 28. Typically, magnet 28 might have an inner diameter of 1.937 inches and crystal holder 24 would have a diameter of 1.859 inches. Crystal holder 24 is located within magnet 28 and is substantially coaxial therewith. Crystal holder 24 is supported by support frame 22 in movable relationship thereto. Rigid members, such as stainless steel rods 42, are secured at one end to the crystal holder 24 as by threaded engagement therewith and extend upwardly therefrom through openings 44 in backing plate 32. Openings 44 are of slightly greater diameter than the diameter of rods 42 for reasons to be explained hereinafter. Rods 42 are axially slidable within openings 44 and are of sufficient length to permit crystal holder 24 to be slidably movable within support frame 22 between a back or withdrawn protected position toward backing plate 32 and a forward or extended operative position near the forward or lower end of magnet 28. A stop member, such as nut 46 threadedly engaging the upper or back region of each rod 42 behind plate 32, serves to limit the forward extent of travel of crystal holder 24 relative to support frame 22. It will be realized that nuts 46 may be axially adjusted along rods 42 to somewhat vary the forward limit position, however, the forward limit is necessarily as far forward as the forwardmost possible operative position. Three of rods 42 positioned radially outward from and symmetrically about the center of crystal holder 24 and extending through three similarly located openings 44 in backing plate 32 have been found to provide adequate support for the crystal holder.

Crystal holder 24 supports a piezoelectric crystal 26. Crystal 26 is capable of converting mechanical or acoustical energy to electrical energy and vice-versa in a manner well known in the art. Crystal 26 is of a composition which will readily withstand temperatures to 650° F or more. One such commercially available piezoelectric crystal is comprised of lithium niobate. Crystal 26 is preferably a thin circular disk having an outside diameter of 0.75 inch and a thickness of 0.050 inch. The front and back surfaces of crystal 26, lower and upper respectively as appearing in FIG. 1, have thin coatings of electrically conductive material, such as silver, extending substantially entirely thereover. These coatings, not seen in the drawing, serve as the electrode pair by which crystal 26 is connected into an electrical circuit.

Crystal holder 24 includes a crystal supporting surface at its forward or lower face. This crystal supporting surface is principally adapted to provide axial support to crystal 26 relative to support frame 22. However, holder 24 may be designed or machined such that some lateral support is additionally provided to the crystal. Such lateral support might be provided by the downwardly extending annular abutment 48 which defines a crystal receiving recess in the undersurface of crystal holder 24.

A layer of heat resistant, high melting temperature, electrically insultaing material is interposed between crystal holder 24 and crystal 26. Preferably this material is a coating deposited, as by flame spraying, on the lower or front surface of crystal holder 24 entirely over the region of the crystal holder which will be in supportive registry with the crystal. Coating 50 is a ceramic material which is electrically insulative and capable of withstanding the range of temperatures to be encountered in the region of test piece 12. Four such ceramics include zirconium oxide, alumina titania oxide, magnesium oxide and aluminum oxide, with either of the latter two being preferred for economic reasons. Any of these materials, if deposited on the undersurface of crystal holder 24 by any well known flame spraying process, will form the necessary heat resistant electrically insulating layer between the crystal holder and the crystal. Alternately, a thin ceramic wafer between holder 24 and crystal 26 might be used, but is economically and structurally not as desirable.

Crystal 26 is urged into non-bonded supported contact with coating 50 on crystal holder 24 by spring means acting upwardly in tension on the crystal. Crystal holder 24 includes an opening 52 extending therethrough, centrally thereof. The upper, or back, surface of crystal 26 overlies and extends radially beyond opening 52 and includes a spring anchor 54 welded thereto. Spring anchor 54 may typically be a piece of stainless steel wire electrically and mechanically joined to the upper conductive surface of crystal 26 as by high temperature silver soldering thereto. This junction withstands temperatures of 1,000° F or more. An electrically conductive heat resistant coil spring 56 of stainless steel is anchored at its lower end to spring anchor 54 and extends upwardly therefrom in tension to an upper anchor 58 which is rigidly secured to support frame 22. In the preferred embodiment, anchor 58 is formed by a hook in the end of electrically conductive center wire 60 in electrical cable 62. Spring 56 is thus in electrical contact with center conductor 60 and the upper conductive coating of crystal 26 to provide a conductive path therebetween. Spring 56 thus serves both as an electrical lead to crystal 26 and to bias the crystal into supported contact with crystal holder 24.

As previously mentioned, crystal holder 24 is slidably movable relative to support frame 22 between a forward operative position and a rearward or withdrawn protected position. Crystal holder 24 is biased to the forward, operative position by means of a coil spring 64 of stainless steel. Spring 64 is substantially stronger than spring 56 and acts in compression between support frame 22 and the back surface of crystal holder 24 to bias the crystal holder to its operative position. The lower or forward end of spring 64 is seated and laterally restrained in a recess in the back or upper surface of crystal holder 24 and the upper end is seated and laterally restrained on shoulder 66 of flange member 68.

Flange member 68 is affixed, as by welding, to the underside of backing plate 32.

Flange member 68 includes a central opening 70 therethrough in registry with an opening 72 positioned centrally of backing plate member 32. Openings 70 and 72 together form a passageway into which electrical cable 62 extends. Cable 62 is of a commercially available coaxial type having a center conductor 60 surrounded by a conductive metal sheath 74 spaced from and electrically insulated from center conductor 60 by a heat resistant mineral insulator 75. Cable 62 is rigidly secured to support frame 22 against axial and radial motion, as by a weld between backing plate 32 and the metal sheath 74 of the cable. A mechanical connector might also be used. The passageway formed by openings 70 and 72 is sufficient in length and sufficiently closely embraces cable 62 to prevent any radial movement thereof. Conductors 60 and 74 are connected to signal controlling and/or processing means 76 which may be any of a variety of well known types. Signal controlling and processing means 76 may typically be an ultrasonic pulser-receiver and associated recording and display apparatus.

Figure 3:
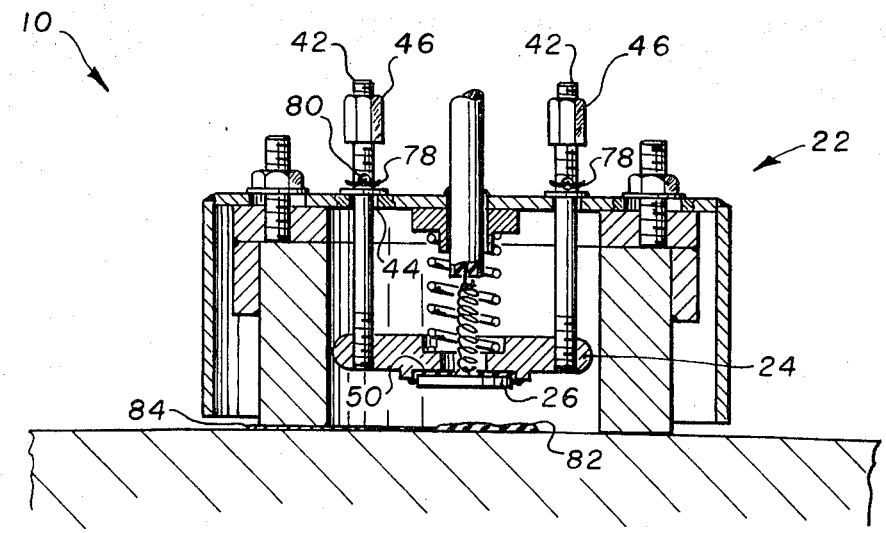
FIG. 3 is a view of the transducer, similar to that of FIG. 1, showing the crystal holder and crystal withdrawn to a protective position within the support frame.
Figure 4:
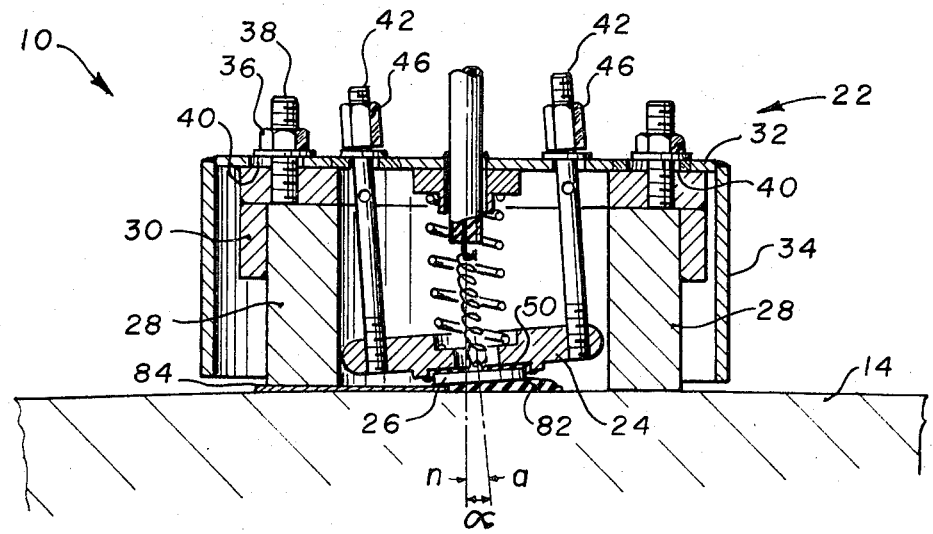
FIG. 4 is a view of the transducer, similar to that of FIG. 1, showing the crystal holder and crystal inclined to the normal.

Referring to FIGS. 1, 3 and 4, positioning of the ultrasonic transducer 10 for operation in combination with test piece 12 will now be discussed. Prior to transducer 10 being placed in contact with test piece 12, the crystal holder 24 and crystal 26 will be withdrawn upwardly or rearwardly to a protected position within support frame 22 as seen in FIG. 3. An operator grasps nut 46 on rods 42 and exerts an upward force to overcome the downward bias of spring 64, thereby withdrawing crystal holder 24 and crystal 26 to a protected position. Locking means such as pins 78 may be inserted into or through holes 80 which extend into or through rods 42, transversely thereof. Holes 80 are positioned longitudinally of rods 42 such that when the rods are moved upwardly and the holes are above or in back of plate 32, the front surface of crystal 26 will be protectively withdrawn behind the forwardmost end surfaces of support frame 22 adapted to contact test piece 12.

In this protected position, the support frame 22 of transducer 10 may be placed into contact with test piece 12 without damaging crystal 26. Such damage might otherwise occur due to the strong magnetic attraction between magnets 28 and vessel wall 14 forcibly and suddenly pulling transducer 10 from the operator's hand during the mounting procedure.

In order to insure a high quality acoustical contact between crystal 26 and test piece 12, an acoustical couplant 82 is placed on the outer surface of vessel wall 14 in the region to be generally contacted by the crystal. The acoustical couplant 82 is selected to have good acoustical transmission properties and for its ability to withstand the temperatures encountered in the operating region. A preferred couplant satisfying these criteria is that of RTV, a silicone rubber which is initially soft and subsequently hardens to a rubbery consistency.

When transducer 10 is finally mounted on test piece 12, locking pins 78 are withdrawn from holes 80 and spring 64 biases crystal holder 24 to its operative position in which the front surface of crystal 26 is in biased contact with vessel wall 14, or couplant 82, if used. The electrical circuit which includes conductor 60, spring 56 and crystal 26 is completed by means of electrical conduction between the conductive front surface of the crystal and vessel wall 14, in turn an electrical contact with magnet 28 of support frame 22, in turn in electrical contact with the outer shield conductor 74 of cable 62.

The electrically conductive path just described assumes either no couplant between crystal 26 and vessel wall 14 or a couplant which is electrically conductive. In the preferred embodiment, couplant 82 is a silicone rubber which is electrically non-conductive and means are required either to bypass vessel wall 14 and provide direct electrical contact between the front surface of crystal 26 and magnet 28 or to provide a conductive path from the crystal front surface to the vessel wall through or around couplant 82. One way to accomplish this is through the addition of sufficient pulverized palladium to the silicone rubber to make it conductive. Another way might be through an annular conductive member in contact with an outer annular region of the front surface of crystal 26 and vessel wall 14. The depicted embodiment employs a very thin, i.e., 1 mil, conductive shunt such as stainless steel strip 84 extending between magnet 28 and a portion of the front surface of crystal 26 as shown in FIGS. 1, 3 and 4. Strip 84 will be inserted between the magent and the test piece before the two are in magnetic contact. When the crystal holder 24 is released from its protective position seen in FIG. 3 to its operative position seen in FIG. 1, crystal 26 will make good electrical and acoustical contact with strip 84 and couplant 82 respectively. The transducer might be operated without either separate acoustical couplant or direct ohmic electrical contact with the crystal front surface, relying on capacitive coupling; however, the crystal sensitivity is sacrificed in such instance.

As earlier mentioned, one portion of support frame 22 is permitted to move relative to the other. This capability is utilized to tilt or vary the angle of crystal holder 24 and crystal 26 relative to the axis of magnet 28. Backing plate 32 is normally fixedly positioned relative to magnet housing 30; however, if the compressive engagement between said two members is released by unthreading nuts 36 on studs 38, plate 32 and the attached protective housing 34 may be moved transversely of magnet 28 in a direction and magnitude determined by the lateral spacing existing between studs 38 and the sides of openings 40 in backing plate 32. Generally speaking, plate 32 is free to move limitedly in any direction in a plane extending normal to the axis of magnet 28.

As seen in FIG. 4, plate 32 has been slid leftwardly relative to its FIG. 1 posiioning on magnet holder 30. By so doing, the upper portions of rods 42 are also moved leftwardly. However, because of the very limited spacing between crystal holder 24 and magnet 28, the crystal holder is not permitted the same degree of lateral or leftward movement. Because openings 44 in plate 32 are somewhat larger than rods 42, the rods pivot thereat when sliding of plate 32 forces the openings to a position other than that in which rods 42 may parallel the axis of magnet 28. Because rods 42 are rigidly secured to crystal holder 24, it is caused to tilt by an amount corresponding to the off-center eccentricity of plate 32 relative to the center axis. As seen in FIG. 4, the center axis of magnet 28 is normal to the surface of vessel wall 14 and when plate 32 is centrally aligned therewith results in an orientation of crystal holder 24 which projects or receives an energy beam at crystal 26 in a direction represented by N. By laterally moving back plate 32, the energy beam direction may be varied to a direction A which represents an angle $\alpha$ relative to N. This angulation capability extends in all directions about normal crystal orientation and beam direction N. Typically, angle $\alpha$ will range from 0°–4° or 5°.

The need to vary the angle of crystal 26 generally arises because the inner surface of cladding 20 on vessel wall 14 is somewhat irregular, thereby causing some deflection of the ultrasonic beam transiting therethrough. By varying the angle of the crystal, an angle for optimum response may be obtained. Selection of an optimum angle occurs as the final step in positioning transducer 10 and involves randomly trying a variety of angles and monitoring the return signal strength to determine which angulation is best. When this is obtained the nuts 36 are rethreaded to securely engage back plate 32 with the fixed portion of support frame 22 to maintain the selected angle. In the angulation shown in FIG. 4, strip 84 is forced into electrical contact with crystal 26 by vessel wall 14; however, even if the angulation is reversed, the strip is sufficiently flexible and deformable and the angle sufficiently small that the strip maintains good electrical contact with the crystal.

It will be understood that the embodiment shown and described herein is merely illustrative and that changes may be made without departing from the scope of the invention as claimed.

What is claimed is:

1. An ultrasonic transducer for use in a high temperature environment comprising in combination:
   a support frame;
   a crystal holder supported by and movable relative to said support frame, said holder having a support surface;
   a layer of electrically insulating material on said crystal holder support surface;
   a piezoelectric crystal including electrically conductive front and back surfaces thereon;
   first means for biasing said back surface of said crystal into engagement with said layer of insulating material on said crystal holder support surface;
   second means for biasing said crystal holder in the direction of said crystal front surface, whereby said crystal front surface is presented for contact with an acoustically conductive medium in the high temperature environment; and
   means for connecting said crystal in an electrical circuit.

2. The apparatus as in claim 1 wherein said layer of insulating material on said crystal holder support surface is a coating of ceramic material bonded thereto.

3. The apparatus as in claim 2 wherein said ceramic material is selected from the group consisting of magnesium oxide, aluminum oxide, zirconium oxide and alumina titania oxide.

4. The apparatus of claim 1 wherein said first and second biasing means are first and second coil springs respectively, said first spring acting in tension between the back surface of said crystal and said support frame and said second spring acting in compression between said crystal holder and said support frame.

5. The apparatus as in claim 4 wherein said first spring is electrically conductive and insulated from said support frame to provide a first electrical path to said conductive back surface of said crystal and conductive means including said support frame provide a second electrical path to said conductive front surface of said crystal for connecting said crystal in an electrical circuit.

6. An ultrasonic transducer for use in a high temperature environment comprising:
 a support frame including a crystal holder supported thereby;
 a layer of electrically insulating material disposed on a support surface of said crystal holder;
 a piezoelectric crystal having front and back surfaces with electrically conductive coatings thereon;
 spring means acting between said crystal and said frame for urging said crystal conductive back surface into supported contact with said insulating material on said crystal holder support surface; and
 means for connecting said front and back electrically conductive crystal surfaces into an electrical circuit.

7. In an ultrasonic inspection system wherein ultrasonic energy is coupled between an ultrasonic transducer and a test piece in a high temperature environment said ultrasonic transducer comprising:
 a support frame adapted to be fixedly positioned in close proximity with the surface of said test piece in said high temperature environment;
 a crystal holder supported by said frame in movable relationship therewith toward and away from said surface of said test piece;
 a layer of electrically insulating material disposed on a surface of said holder;
 a piezoelectric crystal having first and second electrodes on opposite surfaces thereof;
 first means urging said first electroded surface of said crystal into supported contact with said crystal holder, said first electrode contacting only said insulating material on said crystal holder whereby to be electrically isolated therefrom;
 second means urging said crystal holder toward said test piece surface whereby said second electroded surface of said crystal is presented for acoustical contact with said surface of said test piece; and
 circuit means communicating electrically with said first and second electrodes to complete an electrical circuit including said crystal.

8. The apparatus as in claim 7 wherein said test piece is ferromagnetic and said support frame includes magnet means affixed thereto for magnetically engaging said frame with the surface of said test piece.

9. The apparatus of claim 7 wherein:
 said support frame includes a forward portion for contact with the surface of said test piece;
 said crystal holder is movable between a forward exposed position which extends the forward surface of said crystal at least to the forward extent of said support frame and a protected position in which the forward surface of said crystal is withdrawn rearwardly of the forward extent of said support frame;
 said second means urge said crystal holder and crystal toward said exposed position; and including
 means for releasibly locking said crystal holder into said withdrawn protected position.

10. The apparatus of claim 7 wherein said support frame includes a first portion for fixed positioning in close proximity with the surface of said test piece and a second portion supporting said crystal holder and movable relative to said support frame first portion to vary the angle of said crystal relative to the surface of said test piece.

11. The apparatus of claim 10 wherein:
 said first portion of said support frame includes a cylindrical member having its axis substantially normal to the surface of said test piece;
 said crystal holder is of circular cross-section slightly smaller than and movable within the inner diameter of said cylindrical member, said crystal holder being supported by rigid means secured thereto and pivotably depending from said second portion of said support frame; and
 said support frame second portion is spaced from the surface of said test piece and is movable transversely of the axis of said cylindrical member of said first portion, whereby to vary the angle of said crystal relative to the surface of said test piece.

12. The apparatus of claim 11 wherein said test piece is ferromagnetic and said cylindrical member of said support frame first portion is a magnet.

* * * * *